United States Patent
Chen et al.

(10) Patent No.: US 9,768,895 B2
(45) Date of Patent: Sep. 19, 2017

(54) MULTIPATH TIME DELAY ESTIMATION APPARATUS AND METHOD AND RECEIVER

(71) Applicant: FUJITSU LIMITED, Kawasaki-shi, Kanagawa (JP)

(72) Inventors: Pei Chen, Beijing (CN); Jianmin Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/169,231

(22) Filed: May 31, 2016

(65) Prior Publication Data
US 2016/0352444 A1    Dec. 1, 2016

(30) Foreign Application Priority Data

Jun. 1, 2015  (CN) .......................... 2015 1 0292559

(51) Int. Cl.
*H04B 1/06* (2006.01)
*H04B 17/364* (2015.01)
(Continued)

(52) U.S. Cl.
CPC ............. *H04B 17/364* (2015.01); *H04B 1/06* (2013.01); *H04B 1/1081* (2013.01); *H04B 17/318* (2015.01)

(58) Field of Classification Search
CPC ...... H04B 17/318; H04B 17/364; H04B 1/06; H04B 1/709
See application file for complete search history.

(56) References Cited

U.S. PATENT DOCUMENTS

| | | | |
|---|---|---|---|
| 8,861,122 B1 * | 10/2014 | Hwang | G11B 5/59616 360/55 |
| 2004/0017843 A1 * | 1/2004 | Fitton | H04B 1/7107 375/148 |

(Continued)

FOREIGN PATENT DOCUMENTS

| | | |
|---|---|---|
| CN | 1777159 A | 5/2006 |
| CN | 102131288 A | 7/2011 |

(Continued)

OTHER PUBLICATIONS

Wu, R., et al., "Super Resolution Time Delay Estimation via MODE-WRELAX," IEEE Transactions on Aerospace and Electronic Systems, vol. 35, No. 1, Jan. 1999.

(Continued)

*Primary Examiner* — Devan Sandiford
(74) *Attorney, Agent, or Firm* — Arent Fox LLP

(57) ABSTRACT

Embodiments of the present disclosure provide a multipath time delay estimation apparatus and method and a receiver. Time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

11 Claims, 8 Drawing Sheets

(51) Int. Cl.
  *H04B 17/318* (2015.01)
  *H04B 1/10* (2006.01)

(56) References Cited

U.S. PATENT DOCUMENTS

| | | | | |
|---|---|---|---|---|
| 2004/0252652 | A1* | 12/2004 | Berestesky | H04B 3/23 370/286 |
| 2006/0203894 | A1* | 9/2006 | Ventola | H04B 1/7093 375/148 |
| 2008/0062043 | A1 | 3/2008 | Gezici et al. | |
| 2008/0130794 | A1* | 6/2008 | Chong | G01S 5/0221 375/317 |

FOREIGN PATENT DOCUMENTS

| | | |
|---|---|---|
| CN | 103200136 A | 7/2013 |
| WO | WO 2007/007408 A1 | 1/2007 |

OTHER PUBLICATIONS

Ouyang, X., et al., "Time Delay Estimation Using Windowed Differential Magnitude of Cross Correlation and Its Hilbert Transform," Procedia Engineering, 29, pp. 2033-2038, 2012.

\* cited by examiner

MULTIPATH TIME DELAY ESTIMATION APPARATUS AND METHOD AND RECEIVER

CROSS-REFERENCE TO RELATED APPLICATIONS

This application is a U.S. Patent Application which claims priority to Chinese Patent Application No. 201510292559.0, filed Jun. 1, 2015. The disclosure of the priority application is incorporated in its entirety herein by reference.

FIELD

The present disclosure relates to the field of communication technologies, and in particular to a multipath time delay estimation apparatus and method and a receiver.

BACKGROUND

In a wireless communication system, wireless signals are affected by propagation environments, thereby producing reflection, diffraction and scatter in propagation paths. Hence, when signals of a transmitter end arrive at a receiver end, the signals are not transmitted by a single path, but are superimposition of multiple signals transmitted by multiple paths, and this phenomenon is called as a multipath effect. As actual distances of the propagation paths are different, times of arrival of the signals of the paths at the receiver end are different. In an actual communication system, it is often needed to estimate time delay of the multiple paths. Accurate estimation of the time delay of the multiple paths may improve accuracy of measurement of wireless channels, thereby improving channel transmission performance, and furthermore, may also improve positioning precision in positioning applications.

Currently, an existing multipath time delay estimation method often adopts a multiple signal classification (MUSIC) algorithm with super-resolution, including a frequency domain MUSIC algorithm and a time domain MUSIC algorithm. FIG. 1 is a flowchart of an existing method for estimating multipath time delay based on the frequency domain MUSIC algorithm. As shown in FIG. 1, the method includes: step 101: transmitting signals; step 102: receiving signals passing through wireless channels; step 103: performing channel estimation in the frequency domain; step 104: generating a covariance matrix by using the frequency domain MUSIC algorithm, and performing feature value decomposition and spectral peak search; and step 105: performing multipath time delay estimation.

FIG. 2 is a flowchart of an existing method for estimating multipath time delay based on the time domain MUSIC algorithm. As shown in FIG. 2, the method includes: step 201: transmitting signals; step 202: receiving signals passing through wireless channels; step 203: performing cross-correlation operations on transmission signals and received signals, so as to obtain cross-correlation values to which different time delays correspond; step 204: generating a covariance matrix by using the time domain MUSIC algorithm, and performing feature value decomposition and spectral peak search; and step 205: performing multipath time delay estimation.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In performing the multipath time delay estimation by using the above method based on the frequency domain MUSIC algorithm, a requirement on a signal to noise ratio of the received signals is relatively high, and when there exist paths of relatively strong signal power (hereinafter referred to as "strong paths") in the multiple paths, a resolution capability to paths of relatively weak signal power (hereinafter referred to as "weak paths") is lowered, thus time delay of the weak paths cannot be estimated accurately; furthermore, in estimating time delay of multiple paths at the same time, resolution of the time delay estimation is obviously lowered. While in performing the multipath time delay estimation by using the above method based on the time domain MUSIC algorithm, there still exist problems that time delay of the weak paths cannot be estimated accurately due to a lower of a resolution capability to weak paths, time delay, and in estimating time delay of multiple paths at the same time, resolution of the time delay estimation is obviously lowered.

Embodiments of the present disclosure provide a multipath time delay estimation apparatus and method and a receiver. Time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

According to a first aspect of embodiments of the present disclosure, there is provided a multipath time delay estimation apparatus, including: a calculating unit configured to perform cross-correlation calculation on a transmission signal and a received signal, so as to obtain cross-correlation values to which different time delays correspond; a dividing unit configured to divide time delay of cross-correlation values greater than a first threshold value into at least two subzones; and an estimating unit configured to perform time delay estimation on each signal transmission path in each subzone respectively; wherein, in performing time delay estimation on each signal transmission path in each subzone, cross-correlation values of other subzones are set to be predefined values.

According to a second aspect of the embodiments of the present disclosure, there is provided a receiver, including the multipath time delay estimation apparatus described in the first aspect.

According to a third aspect of embodiments of the present disclosure, there is provided a multipath time delay estimation method, including: performing cross-correlation calculation on a transmission signal and a received signal, so as to obtain cross-correlation values to which different time delays correspond; dividing time delay of cross-correlation values greater than a first threshold value into at least two subzones; and performing time delay estimation on each signal transmission paths in each subzone respectively; wherein, in performing time delay estimation on each signal transmission path in each subzone, cross-correlation values of other subzones are set to be predefined values.

An advantage of embodiments of the present disclosure exists in that time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

With reference to the following description and drawings, the particular embodiments of the present disclosure are disclosed in detail, and the principle of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Embodiment 1

Figure 1:
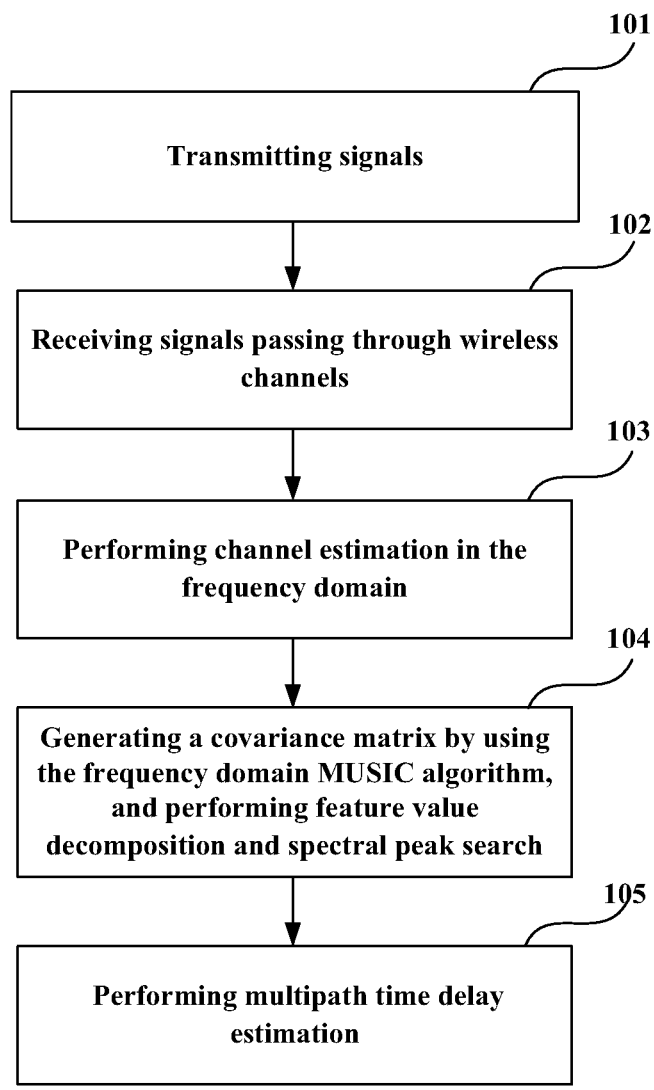
FIG. 1 is a flowchart of an existing method for estimating multipath time delay based on the frequency domain MUSIC algorithm.
Figure 2:
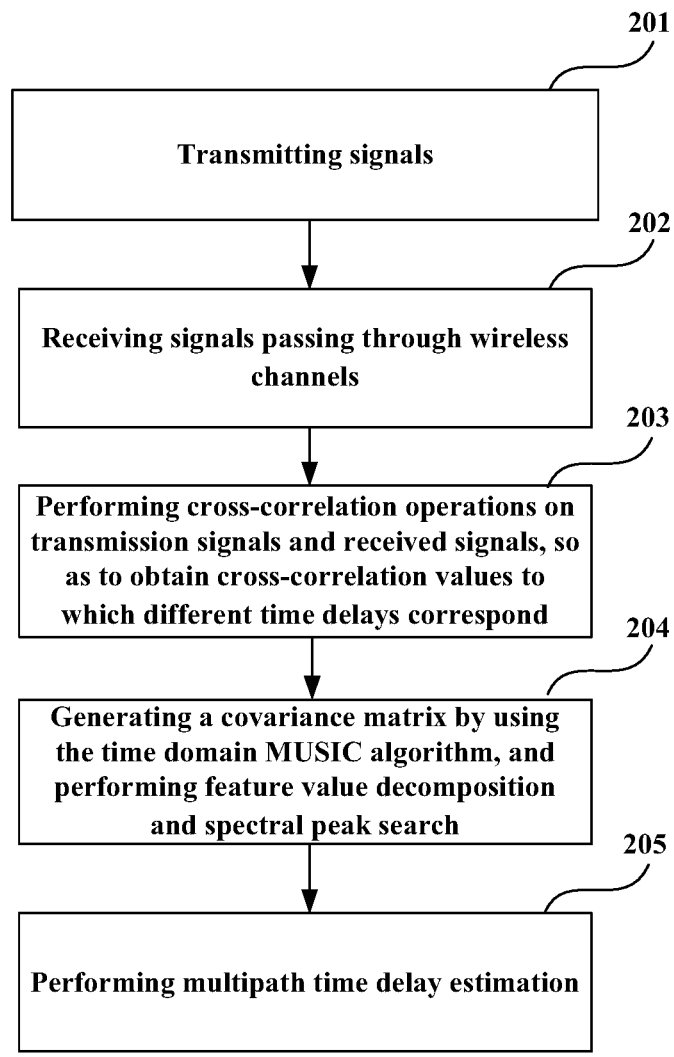
FIG. 2 is a flowchart of an existing method for estimating multipath time delay based on the time domain MUSIC algorithm.
Figure 3:
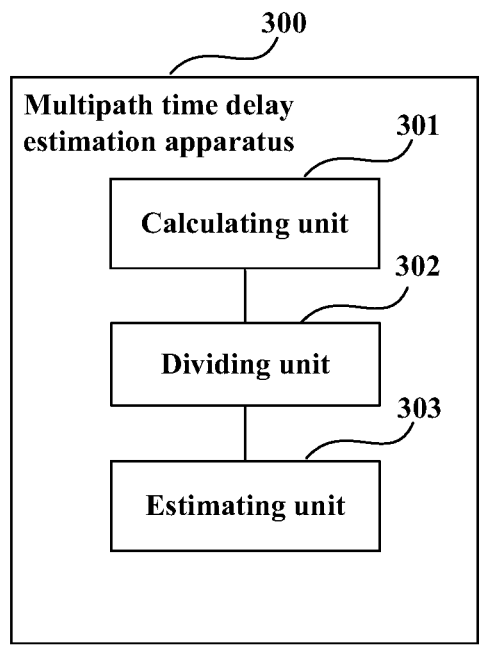
FIG. 3 is a schematic diagram of a structure of the multipath time delay estimation apparatus of Embodiment 1 of the present disclosure.

FIG. 3 is a schematic diagram of a structure of the multipath time delay estimation apparatus of Embodiment 1 of the present disclosure. As shown in FIG. 3, the apparatus 300 includes: a calculating unit 301, a dividing unit 302 and an estimating unit 303.

The calculating unit 301 is configured to perform cross-correlation calculation on a transmission signal and a received signal, so as to obtain cross-correlation values to which different time delays correspond;

the dividing unit 302 is configured to divide time delay of cross-correlation values greater than a first threshold value into at least two subzones;

and the estimating unit 303 is configured to perform time delay estimation on each signal transmission path in each subzone respectively; wherein, in performing time delay estimation on each signal transmission path in each subzone, cross-correlation values of other subzones are set to be predefined values.

It can be seen from the above embodiment that the time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

In this embodiment, the calculating unit 301 is configured to perform cross-correlation calculation on a transmission signal and a received signal, so as to obtain cross-correlation values to which different time delays correspond; for example, the calculating unit 301 may perform the cross-correlation calculation on a transmission signal and a received signal by using an existing method. A method for performing cross-correlation calculation shall be illustrated below.

At a transmitter end of signals, a transmitter may transmit signals according to Formula (1) below:

$$Tx(t)=s(t)e^{j\omega_0 t} \quad (1);$$

where, Tx(t) denotes signals transmitted by the transmitter, s(t) is known transmission signals, $\omega_0$ is a carrier angular frequency, and t is a time.

Wireless channels h(t) passed through by the signals transmitted by the transmitter may be denoted by Formula (2) below:

$$h(t) = \sum_{d=1}^{D} \alpha_d \delta(t - \tau_d); \quad (2)$$

where, D is the number of multiple paths of the channels, $\alpha_d$ is an amplitude of a d-th path, $\tau_d$ is time delay of the d-th path, D and d being positive integers, and t is a time.

At a receiver end of signals, signals received by a receiver after being down converted and ADC (analog-to-digital conversion) sampled may be denoted by Formula (3) below:

$$Rx(n) = \sum_{d=1}^{D} \lambda_d s(n - \tau_d) + w(n); \quad (3)$$

where, Rx(n) denotes the signals received by the receiver, D is the number of multiple paths of the channels, w(n) is a noise sequence, $\lambda_d = \alpha_d e^{j\omega_0 \tau_d}$ is a complex amplitude of the d-th path of the channels, $\tau_d$ is the time delay of the d-th path, D and d being positive integers, and n is a serial number of sampling points.

The calculating unit 301 performs the cross-correlation calculation on the transmission signal s(t) and the received signal Rx(n) according to Formula (4) below:

$$R_{yx}(\tau) = \sum_{n=0}^{N-1} s(n-\tau) Rx^*(n); \quad (4)$$

where, $R_{yx}(\tau)$ denotes a cross-correlation value to which time delay $\tau$ corresponds, n is a serial number of sampling points, N is the number of the sampling points, n being an integer, N being a positive integer, $\tau$ being a non-negative number.

In this embodiment, after the calculating unit 301 calculates the cross-correlation values to which the different time delays correspond, the dividing unit 302 divides the time delay of the cross-correlation values greater than the first threshold value into at least two subzones.

In this embodiment, the first threshold value may be set according to an actual situation. For example, the first threshold value may be set to be a product of a maximum value of the cross-correlation values and a predefined ratio, the predefined ratio being, for example, 0.2.

In this embodiment, in the subzones, the time delay may be consecutive. And paths within the same subzone may be made to be within correlation time by dividing the consecutive time delay into the same subzone, thereby further improving accuracy of the time delay estimation.

A method of dividing the time delay of the cross-correlation values greater than the first threshold value into at least two subzones by the dividing unit 302 shall be exemplarily described below.

Figure 4:
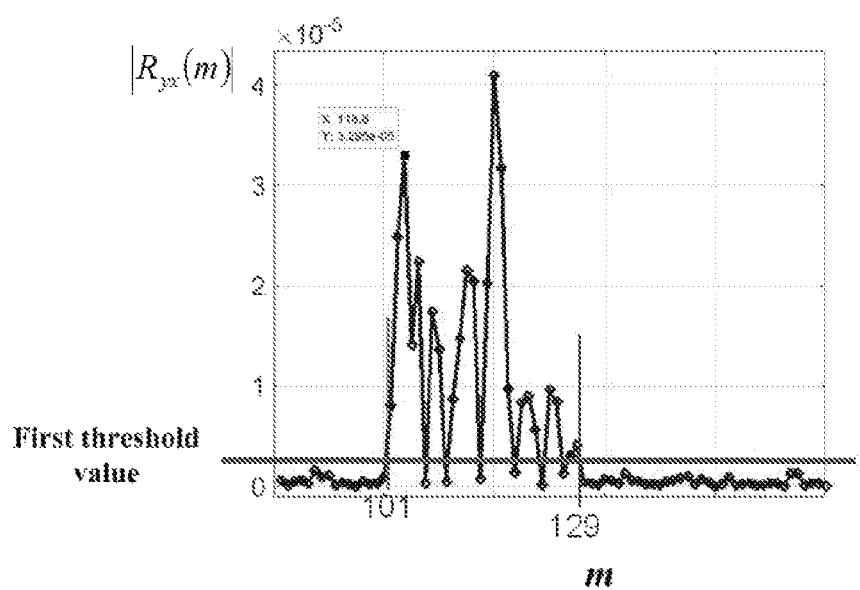
FIG. 4 is a schematic diagram of cross-correlation functions to which different time delays correspond of Embodiment 1 of the present disclosure.

FIG. 4 is a schematic diagram of cross-correlation function to which different time delays correspond of Embodiment 1 of the present disclosure. As shown in FIG. 4, there exists a corresponding cross-correlation value $|R_{yx}(m)|$ for each time delay point m, for example, a set of time delay points of the cross-correlation value $|R_{yx}(m)|$ greater than the first threshold value {m:$|R_{yx}(m)|$>The first threshold value}={101,102,103,104,105,107,108,110,111,112,113, 115,116,117,118,120,121,122, 124,125, 127,128,129}, m being an integer greater than or equal to 0.

In this embodiment, the dividing unit 302 may divide the above set into seven zones as below:

zone(1)={101,102,103,104,105}; zone(2)={107,108}; zone(3)={110,111,112,113}; zone(4)={115,116,117,118}; zone(5)={120,121,122}; zone(6)={124,125}; zone(7)={127,128,129}.

In this embodiment, after the dividing unit 302 divides the time delay into at least two subzones according to the cross-correlation values, the estimating unit 303 performs time delay estimation on each signal transmission path in each subzone respectively; wherein, in performing time delay estimation on each signal transmission path in each subzone, cross-correlation values of other subzones are set to be predefined values.

In this embodiment, in performing time delay estimation on each signal transmission path in each subzone, by setting cross-correlation values of other subzones to be predefined values, influence of strong paths of other subzones on the time delay estimation on each path in the current subzone may be lowered, thereby efficiently improving accuracy of time delay estimation of weak paths. Hence, the predefined values are sufficiently small values, and may be set according to an actual situation. For example, the predefined values are 0.

In this embodiment, in performing time delay estimation on each signal transmission path in each subzone by the estimating unit 303, the cross-correlation values of other subzones may be set to be predefined values according to Formula (5) below:

$$R_{yx,i,0}(m) = \begin{cases} R_{yx}(m), m \in \text{zone}(i) \\ 0, \text{other} \end{cases}; \quad (5)$$

where, $R_{yx,i,0}(m)$ denotes the cross-correlation values of subzones in performing time delay estimation on an i-th subzone, and m is a time delay point, m and i being integers greater than or equal to 0.

A method of performing time delay estimation on each subzone by the estimating unit 303 shall be exemplarily described below.

Figure 5:
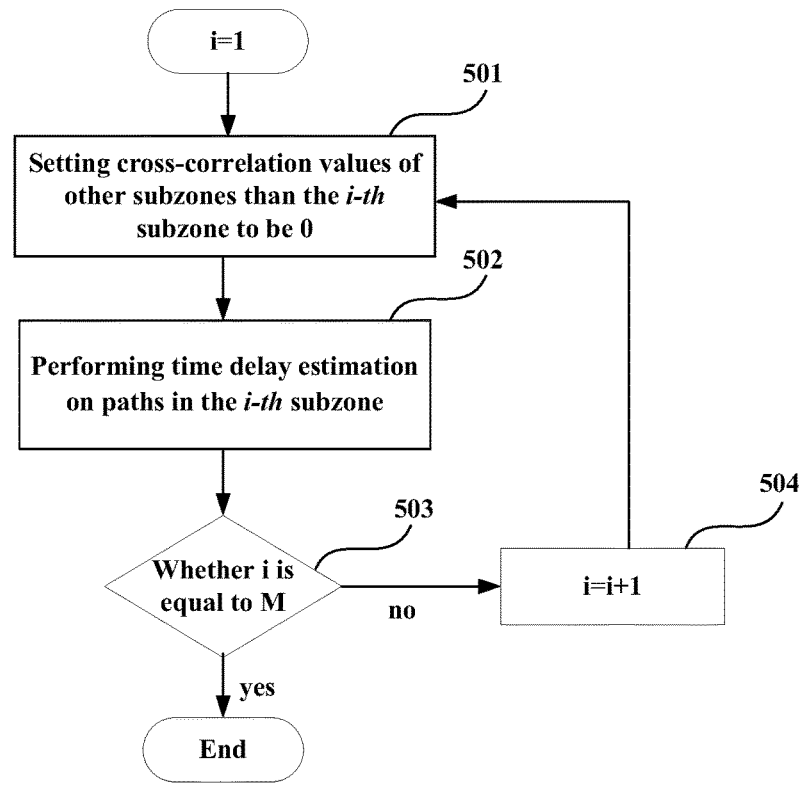
FIG. 5 is a flowchart of a method for performing time delay estimation on all subzones by the estimating unit 303 of Embodiment 1 of the present disclosure.

FIG. 5 is a flowchart of a method for performing time delay estimation on all subzones by the estimating unit 303 of Embodiment 1 of the present disclosure. As shown in FIG. 5, the method includes:

Step 501: setting cross-correlation values of other subzones than the i-th subzone to be 0;

Step 502: performing time delay estimation on paths in the i-th subzone;

Step 503: judging whether i is equal to M, M being the number of subzones, 1≤i≤M, and i and M being positive integers; turning to step 504 when a result of judgment is "no"; and terminating the processing when a result of judgment is "yes"; and Step 504: adding 1 to i, that is, i=i+1.

In this embodiment, in respectively performing time delay estimation on each signal transmission path in each subzone by the estimating unit 303, the time delay estimation may be performed on all signal transmission paths in the subzone successively starting from a signal transmission path of strongest power in the subzone.

In this embodiment, as there may be one or more current signal transmission paths of strongest power in the subzone, in performing time delay estimation each time, the time delay estimation may be performed on current one or more strongest paths.

Hence, by performing the time delay estimation in the subzones starting from a strong path, influence of strong paths in the subzones on the time delay estimation of the weak paths may be eliminated as possible, thereby further efficiently improving accuracy of time delay estimation.

A structure of the estimating unit 303 and a method of performing time delay estimation in each subzone of this Embodiment shall be exemplarily described below.

Figure 6:
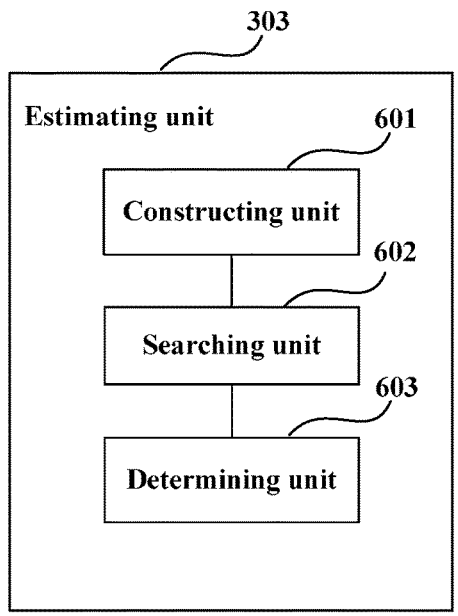
FIG. 6 is a schematic diagram of a structure of the estimating unit 303 of Embodiment 1 of the present disclosure.

FIG. 6 is a schematic diagram of a structure of the estimating unit 303 of Embodiment 1 of the present disclosure. As shown in FIG. 6, the estimating unit 303 includes:

a constructing unit 601 configured to, in each time of performing time delay estimation on the signal transmission paths in the subzone, construct a signal subspace and a noise subspace according to a current cross-correlation value of the subzone;

a searching unit 602 configured to, in each time of performing time delay estimation on the signal transmission paths in the subzone, perform spectral peak search according to the signal subspace and the noise subspace, so as to obtain time delay estimation of a current signal transmission path of strongest power of the subzone; and a determining unit 603 configured to, in each time of performing time delay estimation on the signal transmission paths in the subzone, subtract the current cross-correlation value of the subzone by a cross-correlation value of the current signal transmission paths of strongest power and the transmission signal, and in a case where a result of subtraction is greater than or equal to a second threshold value, determine the result of subtraction as a cross-correlation value used in the next time of performing time delay estimation of the subzone.

Figure 7:
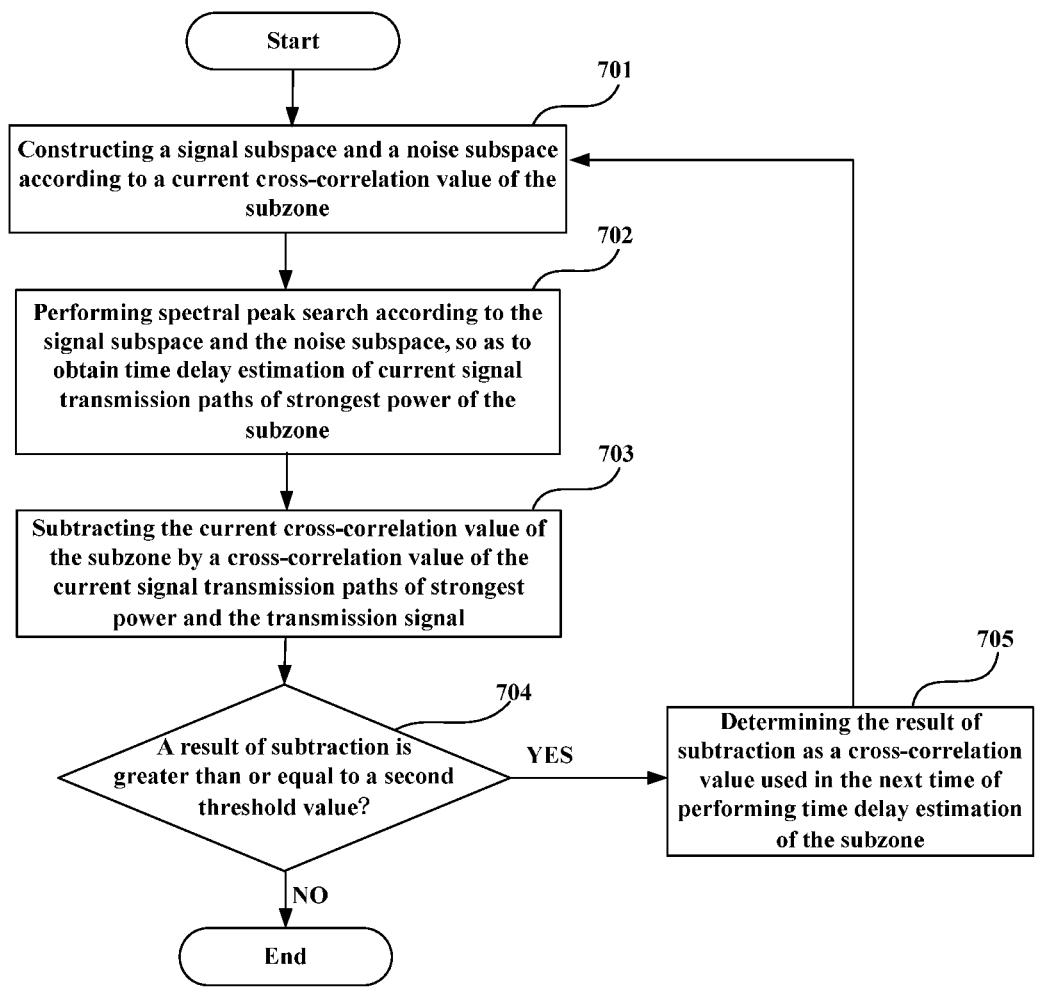
FIG. 7 is a flowchart of a method for performing time delay estimation in an i-th subzone by the estimating unit 303 of Embodiment 1 of the present disclosure.

FIG. 7 is a flowchart of a method for performing time delay estimation in an i-th subzone by the estimating unit 303 of Embodiment 1 of the present disclosure. As shown in FIG. 7, the method is particular steps of step 502 in FIG. 5 and includes:

Step 701: constructing a signal subspace and a noise subspace according to a current cross-correlation value of the subzone;

Step 702: performing spectral peak search according to the signal subspace and the noise subspace, so as to obtain time delay estimation of current signal transmission paths of strongest power of the subzone;

Step 703: subtracting the current cross-correlation value of the subzone by a cross-correlation value of the current signal transmission paths of strongest power and the transmission signal;

Step 704: judging whether a result of subtraction is greater than or equal to a second threshold value, turning to step 705 when the result of subtraction is "no", and terminating the time delay estimation of the subzone; and Step 705: determining the result of subtraction as a cross-correlation value used in the next time of performing time delay estimation of the subzone.

In this embodiment, the constructing unit 601 is configured to, in each time of performing time delay estimation on the signal transmission paths in the subzone, construct a signal subspace and a noise subspace according to a current cross-correlation value of the subzone. A structure of the constructing unit of this embodiment and a method of constructing the signal subspace and the noise subspace shall be exemplarily described below.

Figure 8:
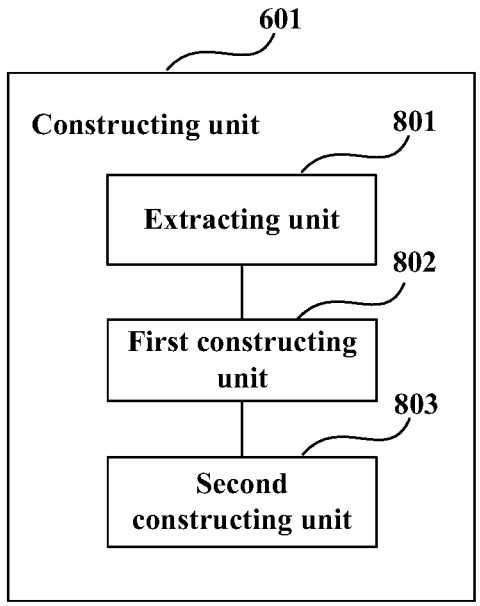
FIG. 8 is a schematic diagram of a structure of the constructing unit 601 of Embodiment 1 of the present disclosure.

FIG. 8 is a schematic diagram of a structure of the constructing unit 601 of Embodiment 1 of the present disclosure. As shown in FIG. 8, the constructing unit 601 includes:

an extracting unit 801 configured to generate a covariance matrix according to the current cross-correlation value of the subzone, and extract feature values from the covariance matrix;

a first constructing unit 802 configured to construct the signal subspace according to feature vectors to which feature values greater than a predefined ratio of the maximum feature value in the feature values correspond; and a second constructing unit 803 configured to construct the noise subspace according to feature vectors to which feature values less than or equal to the predefined ratio of the maximum feature value in the feature values correspond.

Figure 9:
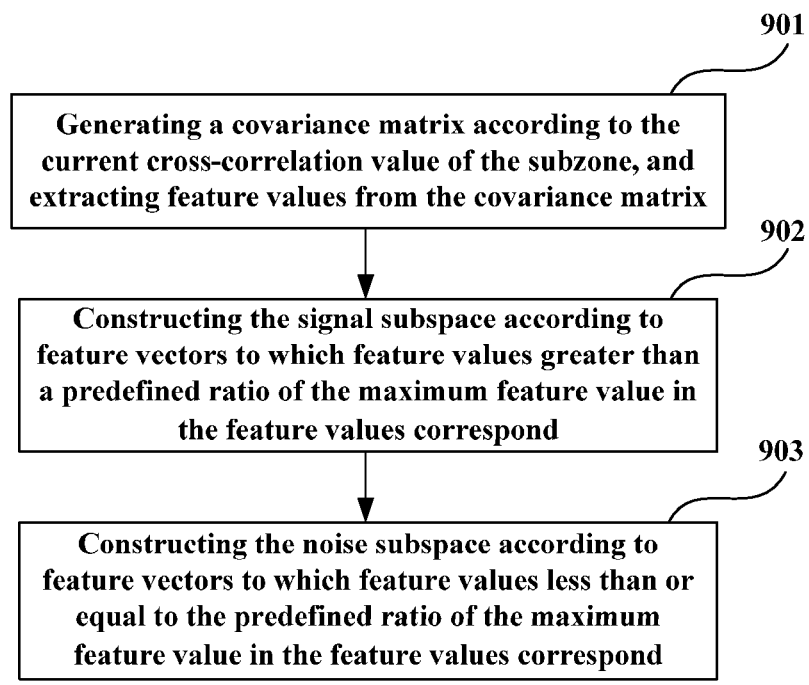
FIG. 9 is a flowchart of a method for constructing a signal subspace and a noise subspace by the constructing unit 601 of Embodiment 1 of the present disclosure.

FIG. 9 is a flowchart of a method for constructing a signal subspace and a noise subspace by the constructing unit 601 of Embodiment 1 of the present disclosure. As shown in FIG. 9, the method includes:

Step 901: generating a covariance matrix according to the current cross-correlation value of the subzone, and extracting feature values from the covariance matrix;

Step 902: constructing the signal subspace according to feature vectors to which feature values greater than a predefined ratio of the maximum feature value in the feature values correspond; and Step 903: constructing the noise subspace according to feature vectors to which feature values less than or equal to the predefined ratio of the maximum feature value in the feature values correspond.

Generating the covariance matrix and extracting the feature values by the extracting unit 801, constructing the signal subspace by the first constructing unit 802 and constructing the noise subspace by the second constructing unit 803 of this embodiment shall be exemplarily described below.

In this embodiment, s(n−τ) in above Formula (4) may be calculated according to Formula (6) below:

$$s(n-\tau) = \sum_{k=0}^{N-1} [S(k)e^{-j2\pi k\tau/N}]e^{j2\pi k n/N}; \qquad (6)$$

where, N is the number of sampling points, k being an integer, τ is time delay, n is a serial number of sampling points, n being an integer, and N being a positive integer.

Formula (6) is inputted into Formula (4), so as to obtain Formula (7) below:

$$R_{yx}(\tau) = \sum_{k=0}^{N-1} \left\{ \sum_{d=1}^{D} \lambda_d^* |S(k)|^2 e^{j2\pi k\tau_d/N} + S(k)W^*(k) \right\} e^{-j2\pi k\tau/N}; \qquad (7)$$

where, $R_{yx}(\tau)$ is a cross-correlation function, D is the number of multiple paths of a channel, $\lambda_d=\alpha_d e^{j\omega_0\tau_d}$ is a complex amplitude of a d-th path, S(k) is discrete Fourier transform of s(n), and $\tau_d$ is time delay of the d-th path, D and d being positive integers, and k being an integer.

γ(k) is defined according to Formula (8) below:

$$\gamma(k) = \sum_{d=1}^{D} \lambda_d^* |S(k)|^2 e^{j2\pi k \tau_d/N} + S(k)W^*(k); \quad (8)$$

where, D is the number of multiple paths of the channel, $\lambda_d=\alpha_d e^{j\omega_0\tau_d}$ is the complex amplitude of the d-th path, S(k) is discrete Fourier transform of s(n), $\tau_d$ is the time delay of the d-th path, N is the number of sampling points, N being a positive integer, D and d being positive integers, and k being an integer.

γ(k) may be expressed in a form of a matrix according to Formula (9) below:

$$\Gamma = \sum_{d=1}^{D} \lambda_d^* \Lambda(\tau_d) S + W = \Phi \cdot \lambda + W; \quad (9)$$

where, $\Gamma=[\gamma(0), \gamma(1), \gamma(2), \ldots, \gamma(N-1)]^T$,
$\Lambda(\tau_d)=\text{diag}\{1, e^{j2\pi\tau_d/N}, e^{j2\pi 2\tau_d/N}, \ldots, e^{j2\pi(N-1)\tau_d/N}\}$,
$\lambda=[\lambda_1^*, \lambda_2^*, \lambda_3^*, \ldots, \lambda_D^*]^T$,
$S=[|S(0)|^2, |S(1)|^2, |S(2)|^2, \ldots, |S(N-1)|^2]^T$,
$\Phi=[\Lambda(\tau_1)S, \Lambda(\tau_2)S, \Lambda(\tau_3)S, \ldots, \Lambda(\tau_D)S]$;

D is the number of multiple paths of the channel, $\lambda_d=\alpha_d e^{j\omega_0\tau_d}$ is the complex amplitude of the d-th path, $\tau_d$ is the time delay of the d-th path, N is the number of sampling points, N being a positive integer, and D and d being positive integers.

It can be seen from above formulae (7) and (8) that the cross-correlation function $R_{yx}(\tau)$ is discrete Fourier transform of γ(k). Hence, γ(k) may be obtained by calculating inverse Fourier transform of the cross-correlation function $R_{yx}(\tau)$, that is, $\Gamma=\text{IFFT}[R_{yx,i,0}(m)]$. Therefore, the covariance matrix generated by the extracting unit 801 may be expressed as $E[\Gamma\Gamma^H]$.

In this embodiment, the extracting unit 801 may perform feature value decomposition on the covariance matrix $E[\Gamma\Gamma^H]$, so as to obtain the feature values and corresponding feature vectors.

In this embodiment, the first constructing unit 802 constructs the signal subspace Q according to the feature vectors to which the feature values greater than the predefined ratio of the maximum feature value in the feature values correspond, and the second constructing unit 803 constructs the noise subspace $G_A$ according to the feature vectors to which the feature values less than or equal to the predefined ratio of the maximum feature value in the feature values correspond.

In this embodiment, after the constructing unit 601 constructs the signal subspace Q and the noise subspace $G_A$, an MUSIC time delay spectrum is generated according to Formula (10) below:

$$P(\tau) = \frac{1}{[\Lambda(\tau)S]^H G_A \cdot G_A^H [\Lambda(\tau)S]}; \quad (10)$$

where, P(τ) denotes the MUSIC time delay spectrum, $\Lambda(\tau)=\text{diag}\{1, e^{j2\pi\tau/N}, e^{j2\pi 2\tau/N}, \ldots, e^{j2\pi(N-1)\tau/N}\}$, and $S=[|S(0)|^2, |S(1)|^2, |S(2)|^2, \ldots, |S(N-1)|^2]^T$, $G_A$ denotes the noise subspace, τ denotes time delay, N is the number of the sampling points, N being a positive integer.

The searching unit 602 performs spectral peak search according to the MUSIC time delay spectrum to obtain time delay estimation $\tau_j$ of the current signal transmission paths of strongest power of the subzone, j denoting a serial number of the current signal transmission paths of strongest power of the subzone.

The determining unit 603 subtracts the current cross-correlation value of the subzone by the cross-correlation value of the current signal transmission paths of strongest power and the transmission signal, and in the case where the result of subtraction is greater than or equal to the second threshold value, determines the result of subtraction as the cross-correlation value used in the next time of performing time delay estimation of the subzone.

In this embodiment, the determining unit 603 may perform the subtraction according to Formula (11) below:

$$R_{yx,i,1}(m) = R_{yx,i,0}(m) - \sum_{j=1}^{P} \frac{R_{yx}(\tau_j')}{R_x(0)} R_x(m - \tau_j'); \quad (11)$$

where, $R_{yx,i,1}(m)$ denotes a cross-correlation value used in a next time of performing time delay estimation of an i-th subzone, $R_{yx,i,0}(m)$ denotes a cross-correlation value used in a current time of performing time delay estimation of the i-th subzone, m is a time delay point, $$\sum_{j=1}^{P} \frac{R_{yx}(\tau_j')}{R_x(0)} R_x(m - \tau_j')$$

denotes the cross-correlation value of the current signal transmission paths of strongest power and the transmission signal, $\tau_j'$ denotes time delay estimation of the current signal transmission paths of strongest power of the i-th subzone, j denotes a serial number of the current signal transmission paths of strongest power of the i-th subzone, and P is the number of the current signal transmission paths of strongest power of the i-th subzone, j and P being positive integers.

In this embodiment $R_{yx}(\tau_j')$ and $R_x(m-\tau_j')$ may be obtained by using an existing interpolation method, such as being obtained by using a linear interpolation or spline interpolation method.

In this embodiment, the second threshold value is used to judge whether time delay estimation is performed on all paths in the subzone, and a numeral value of the second threshold value may be set according to an actual situation.

It can be seen from the above embodiment that the time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

Embodiment 2

An embodiment of the present disclosure further provides a receiver, including a multipath time delay estimation apparatus, a structure and functions of the multipath time delay estimation apparatus being the same as those as described in Embodiment 1, and being not going to be described herein any further.

Figure 10:
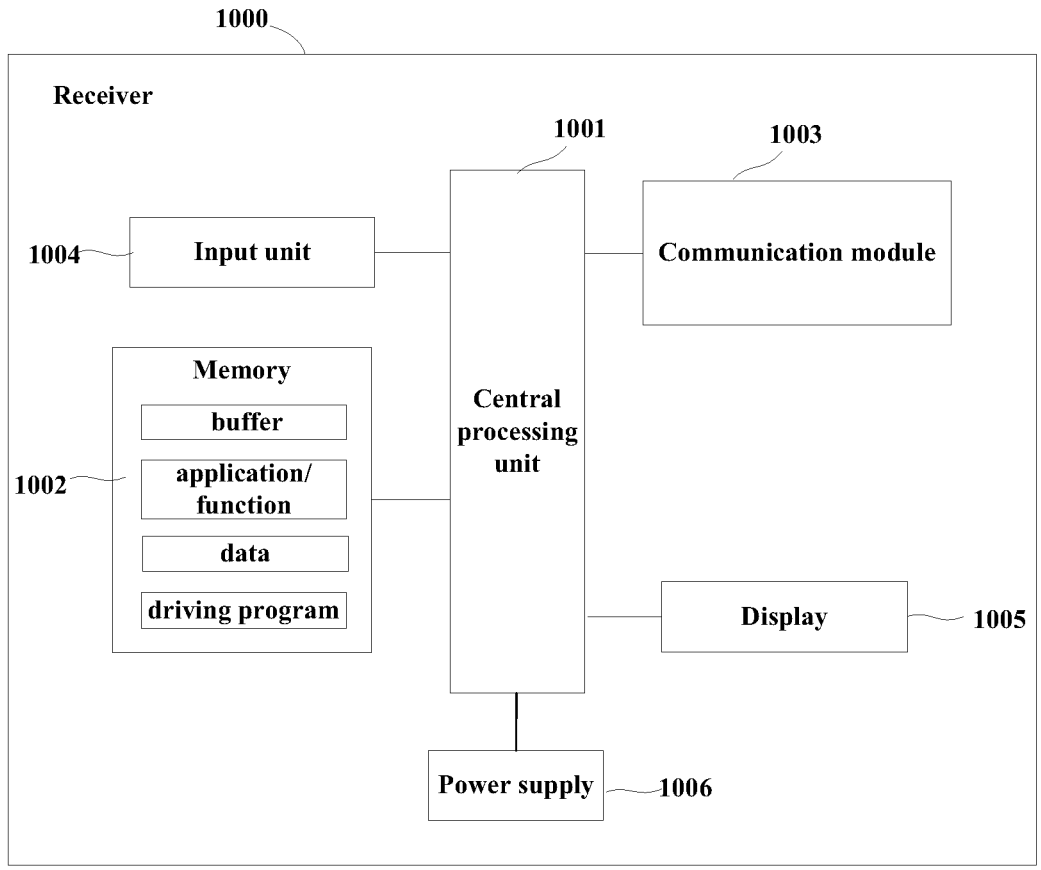
FIG. 10 is a block diagram of a systematic structure of the receiver of Embodiment 2 of the present disclosure.

FIG. 10 is a block diagram of a systematic structure of the receiver of Embodiment 2 of the present disclosure. As shown in FIG. 10, the receiver 1000 may include a central processing unit 1001 and a memory 1002, the memory 1002 being coupled to the central processing unit 1001. This figure is illustrative only, and other types of structures may also be used, so as to supplement or replace this structure and achieve telecommunications function or other functions.

As shown in FIG. 10, the receiver 1000 may further include a communication module 1003, an input unit 1004, a display 1005, and a power supply 1006.

In an implementation, functions of the multipath time delay estimation apparatus may be integrated into the central processing unit 1001. In this embodiment, the central processing unit 1001 may be configured to: perform cross-correlation calculation on a transmission signal and a received signal, so as to obtain cross-correlation values to which different time delays correspond; divide time delay of cross-correlation values greater than a first threshold value into at least two subzones; and perform time delay estimation on each signal transmission path in each subzone respectively; wherein, in performing time delay estimation on each signal transmission path in each subzone, cross-correlation values of other subzones are set to be predefined values.

In this embodiment, in each subzone, the time delay is consecutive.

In this embodiment, the performing time delay estimation on each signal transmission path in each subzone includes: performing time delay estimation on all signal transmission paths in the subzone successively starting from a signal transmission path of strongest power in the subzone.

In this embodiment, each time of performing time delay estimation on the signal transmission paths in the subzone includes: constructing a signal subspace and a noise subspace according to a current cross-correlation value of the subzone; performing spectral peak search according to the signal subspace and the noise subspace, so as to obtain time delay estimation of current signal transmission paths of strongest power of the subzone; and subtracting the current cross-correlation value of the subzone by a cross-correlation value of the current signal transmission paths of strongest power and the transmission signal, and in a case where a result of subtraction is greater than or equal to a second threshold value, determining the result of subtraction as a cross-correlation value used in the next time of performing time delay estimation of the subzone.

In this embodiment, the constructing a signal subspace and a noise subspace according to a current cross-correlation value of the subzone includes: generating a covariance matrix according to the current cross-correlation value of the subzone, and extracting feature values from the covariance matrix; constructing the signal subspace according to feature vectors to which feature values greater than a predefined ratio of the maximum feature value in the feature values correspond; and constructing the noise subspace according to feature vectors to which feature values less than or equal to the predefined ratio of the maximum feature value in the feature values correspond.

In another implementation, the multipath time delay estimation apparatus and the central processing unit 1001 may be configured separately. For example, the multipath time delay estimation apparatus may be configured as a chip connected to the central processing unit 1001, with its functions being realized under control of the central processing unit 1001.

In this embodiment, the receiver 1000 does not necessarily include all the parts shown in FIG. 10.

As shown in FIG. 10, the central processing unit 1001 is sometimes referred to as a controller or control, and may include a microprocessor or other processor devices and/or logic devices. The central processing unit 1001 receives input and controls operations of every components of the receiver 1000.

The memory 1002 may be, for example, one or more of a buffer memory, a flash memory, a hard drive, a mobile medium, a volatile memory, a nonvolatile memory, or other suitable devices. And the central processing unit 1001 may execute the program stored in the memory 1002, so as to realize information storage or processing, etc. Functions of other parts are similar to those of the prior art, which shall not be described herein any further. The parts of the receiver 1000 may be realized by specific hardware, firmware, software, or any combination thereof, without departing from the scope of the present disclosure.

It can be seen from the above embodiment that the time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

Embodiment 3

Figure 11:
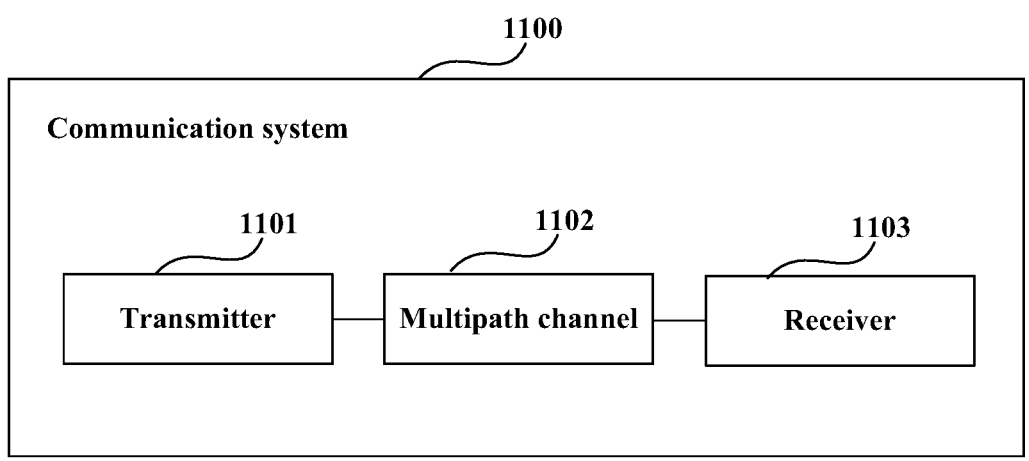
FIG. 11 is a schematic diagram of a structure of the communication system of Embodiment 3 of the present disclosure.

An embodiment of the present disclosure further provides a communication system. FIG. 11 is a schematic diagram of a structure of the communication system of Embodiment 3 of the present disclosure. As shown in FIG. 11, the communication system 1100 includes a transmitter 1101, a multipath channel 1102 and a receiver 1103. In this embodiment, a structure and functions of the receiver 1103 are the same as those described in Embodiment 2, and being not going to be described herein any further. And the transmitter 1101 and the multipath channel 1102 may have existing structures and functions, and the structures and functions of the transmitter 1101 and the multipath channel 1102 are not limited in the embodiments of the present disclosure.

It can be seen from the above embodiment that the time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

Embodiment 4

Figure 12:
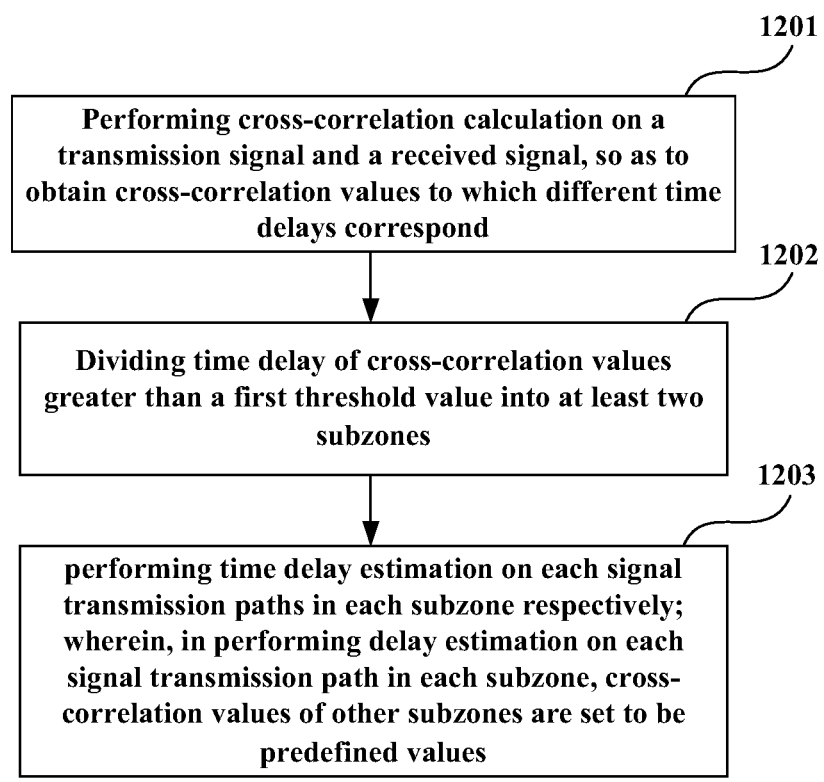
FIG. 12 is a flowchart of the multipath time delay estimation method of Embodiment 4 of the present disclosure.

An embodiment of the present disclosure further provides a multipath time delay estimation method, corresponding to the multipath time delay estimation apparatus described in Embodiment 1. FIG. 12 is a flowchart of the multipath time delay estimation method of Embodiment 4 of the present disclosure. As shown in FIG. 12, the method includes:

Step 1201: performing cross-correlation calculation on a transmission signal and a received signal, so as to obtain cross-correlation values to which different time delays correspond;

Step 1202: dividing time delay of cross-correlation values greater than a first threshold value into at least two subzones; and Step 1203: performing time delay estimation on each signal transmission paths in each subzone respectively; wherein, in performing time delay estimation on each signal transmission path in each subzone, cross-correlation values of other subzones are set to be predefined values.

In this embodiment, a method for performing cross-correlation calculation on a transmission signal and a received signal, a method for dividing time delay into at least two subzones and a method for performing time delay estimation on each signal transmission paths in each subzone are the same as those described in Embodiment 1, and shall not be described herein any further.

It can be seen from the above embodiment that the time delay is divided into at least two subzones according to cross-correlation values of the transmission signal and the received signal, and time delay estimation is performed on each path in each subzone respectively, thereby efficiently improving resolution of the time delay estimation. And in performing time delay estimation on each path in each subzone, cross-correlation values of other subzones are set to be predefined values, so as to lower influence of strong paths of other subzones on the time delay estimation on each path in the current subzone, thereby efficiently improving accuracy of time delay estimation of weak paths.

An embodiment of the present disclosure further provides a computer-readable program, wherein when the program is executed in a multipath time delay estimation apparatus or a receiver, the program enables the multipath time delay estimation apparatus or the receiver to carry out the multipath time delay estimation method as described in Embodiment 4 time delay.

An embodiment of the present disclosure provides a storage medium in which a computer-readable program is stored, wherein the computer-readable program enables a multipath time delay estimation apparatus or a receiver to carry out the multipath time delay estimation method as described in Embodiment 4 time delay.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

For the implementation of the present disclosure containing the above embodiments, following supplements are further disclosed.

Supplement 1. A multipath time delay estimation apparatus, including:

a calculating unit configured to perform cross-correlation calculation on a transmission signal and a received signal, so as to obtain cross-correlation values to which different time delays correspond;

a dividing unit configured to divide time delay of cross-correlation values greater than a first threshold value into at least two subzones; and an estimating unit configured to perform time delay estimation on each signal transmission path in each subzone respectively; wherein, in performing time delay estimation on each signal transmission path in each subzone, cross-correlation values of other subzones are set to be predefined values.

Supplement 2. The apparatus according to supplement 1, wherein in each subzone, the time delay is consecutive.

Supplement 3. The apparatus according to supplement 1, wherein in performing time delay estimation on each signal transmission path in each subzone, the estimating unit performs time delay estimation on all signal transmission paths in the subzone successively starting from a signal transmission path of strongest power in the subzone.

Supplement 4. The apparatus according to supplement 3, wherein the estimating unit includes:

a constructing unit configured to, in each time of performing time delay estimation on the signal transmission paths in the subzone, construct a signal subspace and a noise subspace according to a current cross-correlation value of the subzone;

a searching unit configured to, in each time of performing time delay estimation on the signal transmission paths in the subzone, perform spectral peak search according to the signal subspace and the noise subspace, so as to obtain time delay estimation of current signal transmission paths of strongest power of the subzone; and a determining unit configured to, in each time of performing time delay estimation on the signal transmission paths in the subzone, subtract the current cross-correlation value of the subzone by a cross-correlation value of the current signal transmission paths of strongest power and the transmission signal, and in a case where a result of subtraction is greater than or equal to a second threshold value, determine the result of subtraction as a cross-correlation value used in the next time of performing time delay estimation of the subzone.

Supplement 5. The apparatus according to supplement 4, wherein the constructing unit includes:

an extracting unit configured to generate a covariance matrix according to the current cross-correlation value of the subzone, and extract feature values from the covariance matrix;

a first constructing unit configured to construct the signal subspace according to feature vectors to which feature values greater than a predefined ratio of the maximum feature value in the feature values correspond; and a second constructing unit configured to construct the noise subspace according to feature vectors to which feature values less than or equal to the predefined ratio of the maximum feature value in the feature values correspond.

Supplement 6. A receiver, including the apparatus as described in any one of supplements 1-5.

Supplement 7. A communication system, including the receiver as described in supplement 6.

Supplement 8. A multipath time delay estimation method, including:

performing cross-correlation calculation on a transmission signal and a received signal, so as to obtain cross-correlation values to which different time delays correspond;

dividing time delay of cross-correlation values greater than a first threshold value into at least two subzones; and performing time delay estimation on each signal transmission paths in each subzone respectively; wherein, in performing time delay estimation on each signal transmission path in each subzone, cross-correlation values of other subzones are set to be predefined values.

Supplement 9. The method according to supplement 8, wherein in each subzone, the time delay is consecutive.

Supplement 10. The method according to supplement 8, wherein the performing time delay estimation on each signal transmission paths in each subzone respectively includes:

performing time delay estimation on all signal transmission paths in the subzone successively starting from a signal transmission path of strongest power in the subzone.

Supplement 11. The method according to supplement 10, wherein the performing each time of time delay estimation on the signal transmission paths in the subzone includes:

constructing a signal subspace and a noise subspace according to a current cross-correlation value of the subzone;

performing spectral peak search according to the signal subspace and the noise subspace, so as to obtain time delay estimation of current signal transmission paths of strongest power of the subzone; and subtracting the current cross-correlation value of the subzone by a cross-correlation value of the current signal transmission paths of strongest power and the transmission signal, and in a case where a result of subtraction is greater than or equal to a second threshold value, determining the result of subtraction as a cross-correlation value used in the next time of performing time delay estimation of the subzone.

Supplement 12. The method according to supplement 11, wherein the constructing a signal subspace and a noise subspace according to a current cross-correlation value of the subzone includes:

generating a covariance matrix according to the current cross-correlation value of the subzone, and extracting feature values from the covariance matrix;

constructing the signal subspace according to feature vectors to which feature values greater than a predefined ratio of the maximum feature value in the feature values correspond; and constructing the noise subspace according to feature vectors to which feature values less than or equal to the predefined ratio of the maximum feature value in the feature values correspond.

The invention claimed is:

1. A multipath time delay estimation apparatus, comprising:
    a calculating unit configured to perform cross-correlation calculation on a transmission signal and a received signal, so as to obtain cross-correlation values to which different time delays correspond;
    a dividing unit configured to divide time delay of cross-correlation values greater than a first threshold value into at least two subzones; and
    an estimating unit configured to perform time delay estimation on each signal transmission path in each subzone respectively; wherein, in performing time delay estimation on each signal transmission path in each subzone, cross-correlation values of other subzones are set to be predefined values.

2. The apparatus according to claim 1, wherein in each subzone, the time delay is consecutive.

3. The apparatus according to claim 1, wherein in performing time delay estimation on each signal transmission path in each subzone, the estimating unit performs time delay estimation on all signal transmission paths in the subzone successively starting from a signal transmission path of strongest power in the subzone.

4. The apparatus according to claim 3, wherein the estimating unit comprises:
    a constructing unit configured to, in each time of performing time delay estimation on the signal transmission paths in the subzone, construct a signal subspace and a noise subspace according to a current cross-correlation value of the subzone;
    a searching unit configured to, in each time of performing time delay estimation on the signal transmission paths in the subzone, perform spectral peak search according to the signal subspace and the noise subspace, so as to obtain time delay estimation of current signal transmission paths of strongest power of the subzone; and
    a determining unit configured to, in each time of performing time delay estimation on the signal transmission paths in the subzone, subtract the current cross-correlation value of the subzone by a cross-correlation value of the current signal transmission paths of strongest power and the transmission signal, and in a case where a result of subtraction is greater than or equal to a second threshold value, determine the result of subtraction as a cross-correlation value used in the next time of performing time delay estimation of the subzone.

5. The apparatus according to claim 4, wherein the constructing unit comprises:
    an extracting unit configured to generate a covariance matrix according to the current cross-correlation value of the subzone, and extract feature values from the covariance matrix;
    a first constructing unit configured to construct the signal subspace according to feature vectors to which feature values greater than a predefined ratio of the maximum feature value in the feature values correspond; and
    a second constructing unit configured to construct the noise subspace according to feature vectors to which feature values less than or equal to the predefined ratio of the maximum feature value in the feature values correspond.

6. A receiver, comprising the apparatus as claimed in claim 1.

7. A multipath time delay estimation method, comprising:
    performing cross-correlation calculation on a transmission signal and a received signal, so as to obtain cross-correlation values to which different time delays correspond;
    dividing time delay of cross-correlation values greater than a first threshold value into at least two subzones; and
    performing time delay estimation on each signal transmission paths in each subzone respectively; wherein, in performing time delay estimation on each signal transmission path in each subzone, cross-correlation values of other subzones are set to be predefined values.

8. The method according to claim 7, wherein in each subzone, the time delay is consecutive.

9. The method according to claim 7, wherein the performing time delay estimation on each signal transmission paths in each subzone respectively comprises:

performing time delay estimation on all signal transmission paths in the subzone successively starting from a signal transmission path of strongest power in the subzone.

10. The method according to claim 9, wherein the performing each time of time delay estimation on the signal transmission paths in the subzone comprises:

constructing a signal subspace and a noise subspace according to a current cross-correlation value of the subzone;

performing spectral peak search according to the signal subspace and the noise subspace, so as to obtain time delay estimation of current signal transmission paths of strongest power of the subzone; and subtracting the current cross-correlation value of the subzone by a cross-correlation value of the current signal transmission paths of strongest power and the transmission signal, and in a case where a result of subtraction is greater than or equal to a second threshold value, determining the result of subtraction as a cross-correlation value used in the next time of performing time delay estimation of the subzone.

11. The method according to claim 10, wherein the constructing a signal subspace and a noise subspace according to a current cross-correlation value of the subzone includes:

generating a covariance matrix according to the current cross-correlation value of the subzone, and extracting feature values from the covariance matrix;

constructing the signal subspace according to feature vectors to which feature values greater than a predefined ratio of the maximum feature value in the feature values correspond; and constructing the noise subspace according to feature vectors to which feature values less than or equal to the predefined ratio of the maximum feature value in the feature values correspond.

* * * * *